United States Patent
Chae

(10) Patent No.: US 11,160,082 B2
(45) Date of Patent: Oct. 26, 2021

(54) METHOD FOR TRANSMITTING OR RECEIVING SIGNAL TO OR FROM USER EQUIPMENT BY BASE STATION SUPPORTING FULL DUPLEX IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/961,653

(22) PCT Filed: Jan. 11, 2019

(86) PCT No.: PCT/KR2019/000502
§ 371 (c)(1),
(2) Date: Jul. 10, 2020

(87) PCT Pub. No.: WO2019/139423
PCT Pub. Date: Jul. 18, 2019

(65) Prior Publication Data
US 2020/0404664 A1    Dec. 24, 2020

Related U.S. Application Data

(60) Provisional application No. 62/616,374, filed on Jan. 11, 2018.

(51) Int. Cl.
*H04W 72/04* (2009.01)
*H04L 5/14* (2006.01)
*H04J 13/16* (2011.01)

(52) U.S. Cl.
CPC ........ *H04W 72/0466* (2013.01); *H04J 13/16* (2013.01); *H04L 5/14* (2013.01)

(58) Field of Classification Search
CPC ........ H04W 72/0466; H04J 13/16; H04L 5/14
See application file for complete search history.

(56) References Cited

U.S. PATENT DOCUMENTS

| 8,442,139 B2 * | 5/2013 | Lee | H04B 7/0639 375/267 |
| 8,514,961 B2 * | 8/2013 | Papadopoulos | H04B 7/02 375/267 |

(Continued)

FOREIGN PATENT DOCUMENTS

| KR | 20160127099 | 11/2016 |
| KR | 20160132595 | 11/2016 |

OTHER PUBLICATIONS

PCT International Application No. PCT/KR2019/00502, International Search Report dated Apr. 15, 2019, 2 pages.

(Continued)

*Primary Examiner* — Huy D Vu
*Assistant Examiner* — Bailor C. Hsu
(74) *Attorney, Agent, or Firm* — Lee, Hong, Degerman, Kang & Waimey

(57) ABSTRACT

A method of transmitting and receiving a signal to and from a user equipment (UE) at a base station supporting full duplex in a wireless communication system includes the base station transmitting a first resource element (RE) set including two REs to the UE by applying different precoders to the two REs of the first RE set, and receiving a second RE set including two REs from a plurality of UEs including the UE while the first RE set is transmitted, by applying different post-coders to the two REs of the second RE set. Code division multiplexing (CDM) codes are applied to the first RE set transmitted from the base station to the UE in downlink and the second RE set transmitted from the UE to the base station in uplink.

9 Claims, 14 Drawing Sheets

(56) References Cited

U.S. PATENT DOCUMENTS

| | | | | |
|---|---|---|---|---|
| 2012/0106595 A1* | 5/2012 | Bhattad | ............ | H04L 25/03866 |
| | | | | 375/146 |
| 2012/0207084 A1* | 8/2012 | Seo | .................. | H04W 16/26 |
| | | | | 370/315 |
| 2012/0275411 A1* | 11/2012 | Kim | .................. | H04L 5/0032 |
| | | | | 370/329 |
| 2013/0072247 A1* | 3/2013 | Park | .................. | H04B 7/043 |
| | | | | 455/513 |
| 2015/0181589 A1* | 6/2015 | Luo | ................ | H04W 74/0833 |
| | | | | 370/329 |
| 2015/0358132 A1* | 12/2015 | Wallen | ................ | H04L 5/0048 |
| | | | | 370/329 |
| 2016/0212750 A1* | 7/2016 | Xu | .................. | H04B 7/0456 |
| 2016/0337015 A1* | 11/2016 | Fazlollahi | ............ | H04B 7/0456 |
| 2017/0201982 A1* | 7/2017 | Rico Alvarino | ...... | H04L 5/0044 |
| 2017/0257177 A1 | 9/2017 | Noh et al. | | |
| 2018/0375628 A1* | 12/2018 | Lee | .................. | H04L 5/0048 |

OTHER PUBLICATIONS

LG Electronics et al., "Motivation for new SI: Study on Flexible and Full Duplex for NR," 3GPP TSG RAN Meeting #78, RP-172501, Lisbon, Portugal, Dec. 18-21, 2017, 10 pages.

Fujitsu, "Discussion on duplexing modes in NR," 3GPP TSG RAN WG1 Meeting #86bis, R1-1608925, Lisbon, Portugal, Oct. 10-14, 2016, 6 pages.

* cited by examiner

METHOD FOR TRANSMITTING OR RECEIVING SIGNAL TO OR FROM USER EQUIPMENT BY BASE STATION SUPPORTING FULL DUPLEX IN WIRELESS COMMUNICATION SYSTEM

CROSS-REFERENCE TO RELATED APPLICATIONS

This application is the National Stage filing under 35 U.S.C. 371 of International Application No. PCT/KR2019/000502, filed on Jan. 11, 2019, which claims the benefit of U.S. Provisional Application No. 62/616,374, filed on Jan. 11, 2018, the contents of which are all hereby incorporated by reference herein in their entirety.

BACKGROUND OF THE INVENTION

Field of the Invention

The present disclosure relates to a wireless communication system, and, more particularly, to a method and apparatus for transmitting and receiving a signal by changing precoding and applying code division multiplexing (CDM) at a full duplex base station.

Description of the Related Art

As more communication apparatuses require larger communication capacities, there is a need for improved mobile broadband communication compared to a conventional radio access technology. In addition, massive machine type communications (mMTC) for providing various services anytime anywhere by connecting a plurality of devices and things is also one of major issues to be considered in next-generation communication. In addition, communication system design considering services/UEs sensitive to reliability and latency is being discussed. Introduction of next-generation RAT considering Enhanced mobile Broadband Communication (eMBB), mMTC, Ultra-Reliable and Low Latency Communication (URLLC), etc. is being discussed. In this disclosure, this technology is referred to new radio (NR) for convenience. NR is an expression indicating an example of 5G radio access technology (RAT).

A new RAT system including NR uses an OFDM transmission method or a transmission method similar thereto. The new RAT system may follow OFDM parameters different from OFDM parameters of LTE. Alternatively, the new RAT system may follow numerology of existing LTE/LTE-A but may have a larger system bandwidth (e.g., 100 MHZ). Alternatively, one cell may support a plurality of numerologies. That is, user equipments (UEs) operating with different numerologies may coexist in one cell.

SUMMARY OF THE INVENTION

An object of the present invention is to provide a signal transmission and reception method related to the case where a full duplex base station transmits a resource element (RE) set including two REs by changing precoding and applying code division multiplexing (CDM) and, at the same time, receives signals transmitted by UEs while changing precoding.

According to an embodiment of the present disclosure, provided is a method of transmitting and receiving a signal to and from a user equipment (UE) at a base station supporting full duplex in a wireless communication system including the base station transmitting a first resource element (RE) set including two REs to the UE by applying different precoders to the two REs of the first RE set, and receiving a second RE set including two REs from a plurality of UEs including the UE while the first RE set is transmitted, by applying different post-coders to the two REs of the second RE set, wherein code division multiplexing (CDM) codes are applied to the first RE set transmitted from the base station to the UE in downlink and the second RE set transmitted from the UE to the base station in uplink.

According to an embodiment of the present disclosure, provided is a method of transmitting and receiving a signal to and from a base station at a user equipment (UE) supporting full duplex in a wireless communication system including receiving, from the base station, a first resource element (RE) set including two REs, to which different precoders are applied, and transmitting, to the base station, a second RE set including two REs while the first RE set is transmitted, wherein code division multiplexing (CDM) codes are respectively applied to the first RE set transmitted from the base station to the UE in downlink and the second RE set transmitted from the UE to the base station in uplink.

According to an embodiment of the present disclosure, provided is a base station apparatus supporting full duplex in a wireless communication system including a memory and a processor connected to the memory, wherein the processor transmits a first resource element (RE) set including two REs to the UE by applying different precoders to the two REs of the first RE set, and receives a second RE set including two REs from a plurality of UEs including the UE while the first RE set is transmitted, by applying different post-coders to the two REs of the second RE set, and wherein code division multiplexing (CDM) codes are respectively applied to the first RE set transmitted from the base station to the UE in downlink and the second RE set transmitted from the UE to the base station in uplink.

According to an embodiment of the present disclosure, provided is a user equipment (UE) apparatus supporting full duplex in a wireless communication system including a memory; and a processor connected to the memory, wherein the processor receives, from the base station, a first resource element (RE) set including two REs, to which different precoders are applied; and transmits, to the base station, a second RE set including two REs while the first RE set is transmitted, and wherein code division multiplexing (CDM) codes are respectively applied to the first RE set transmitted from the base station to the UE in downlink and the second RE set transmitted from the UE to the base station in uplink.

Each of the different precoders may be a 2L*L precoding matrix, where L is the number of layers.

The different precoders may be respectively applied to the two REs of the first RE set by jointly precoding 2L*1 transmission symbols in the first RE through two 2L*L precoding matrices.

The different precoders may be linearly independent.

2L data may be transmitted in each of the two REs of the first RE set.

The number of plurality of UEs may be 2L.

The base station may have L radio frequency (RF) chains.

The number of antennas of the base station may be equal to or greater than 2L.

The first RE set and the second RE set may be preset or indicated through higher layer signaling.

According to the present disclosure, in a full duplex radio (FDR) system, it is possible to double network throughput without interference cancellation or accurate channel estimation between UEs.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompany drawings which are included for further understanding of the disclosure and included in this disclosure and which form part of the disclosure illustrate embodiments of the disclosure along with the detailed description that describes the principle of the disclosure.

DESCRIPTION OF THE PREFERRED EMBODIMENTS

Figure 1:
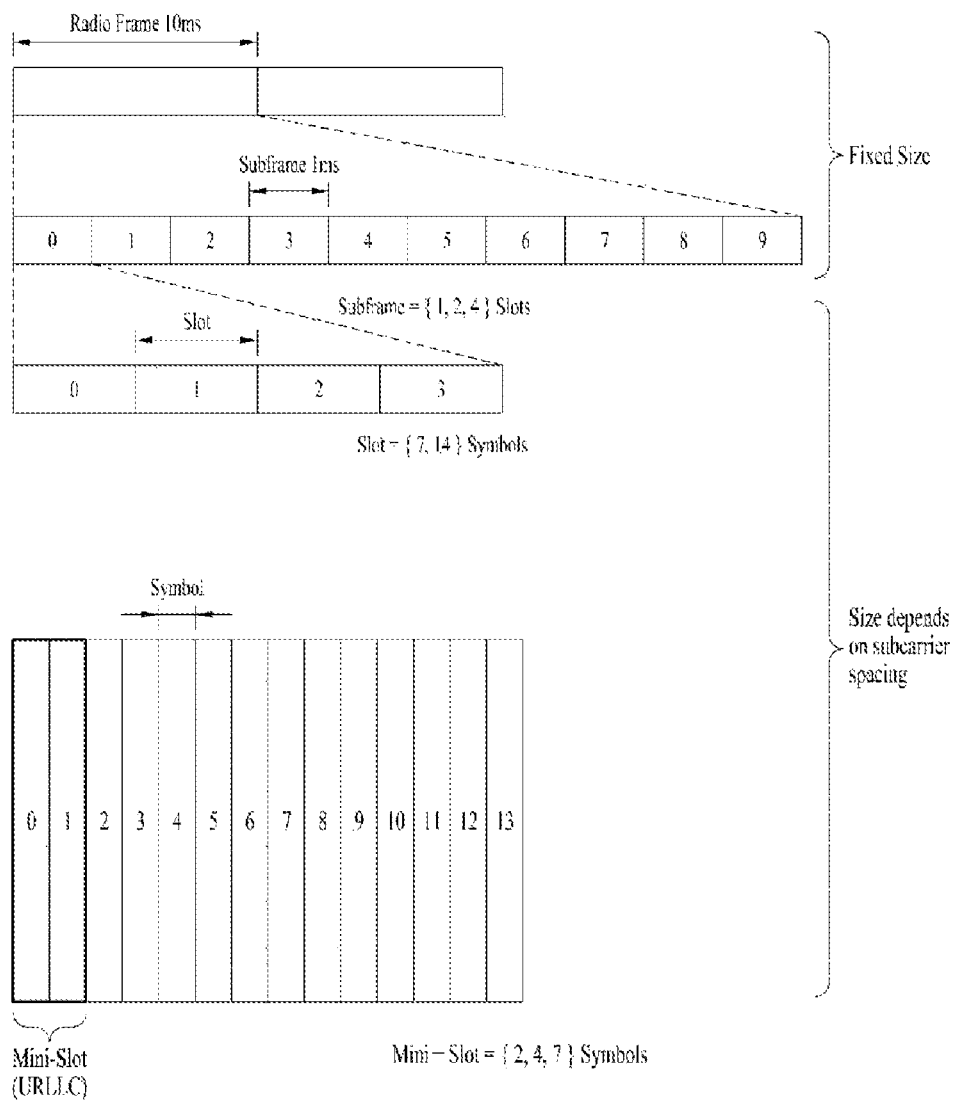
FIG. 1 is a view showing an example of a frame structure in NR.

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. A BS may be referred to as a first communication device, and a UE may be referred to as a second communication device in the present disclosure. The term BS may be replaced with fixed station, Node B, evolved Node B (eNB), next generation Node B (gNB), base transceiver system (BTS), access point (AP), network or 5G network node, artificial intelligence (AI) system, road side unit (RSU), robot and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI module and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA). CDMA may be implemented by radio technologies such as Universal Terrestrial Radio Access (UTRA) or CDMA2000. TDMA may be implemented by radio technologies such as Global System for Mobile communications (GSM)/General Packet Radio Service (GPRS)/Enhanced Data Rates for GSM Evolution (EDGE). OFDMA may be implemented by radio technologies such as IEEE 802.11 (Wi-Fi), IEEE 802.16 (WiMAX), IEEE 802-20 or E-UTRA (Evolved UTRA). UTRA is part of a Universal Mobile Telecommunications System (UMTS). 3rd Generation Partnership Project (3GPP) Long Term Evolution (LTE) is part of an Evolved UMTS (E-UMTS) using E-UTRA, and LTE-A (Advanced)/LTE-A pro is an evolved version of 3GPP LTE. New Radio or New Radio Access Technology (3GPP NR) is an evolved version of 3GPP LTE/LTE-A/LTE-A pro.

In order to clarify the description, the description is based on a 3GPP communication system (e.g., LTE-A or NR), but the technical spirit of the present disclosure is not limited thereto. LTE means technology after 3GPP TS 36.xxx Release 8. Specifically, LTE technology after 3GPP TS 36.xxx Release 10 is referred to as LTE-A and LTE technology after 3GPP TS 36.xxx Release 13 is referred to as LTE-A pro. 3GPP NR means technology after TS 38.xxx Release 15. LTE/NR may be referred to as a 3GPP system. "xxx" means a detailed standard document number. LTE/NR may be collectively referred to as a 3GPP system.

In this disclosure, a node refers to a fixed point capable of transmitting/receiving a radio signal through communication with a UE. Various types of BSs may be used as nodes regardless of the name thereof. For example, a BS, NB, eNB, pico-cell eNB (PeNB), home eNB (HeNB), relay, repeater, etc. may be a node. In addition, the node may not be a BS. For example, the node may be a radio remote head (RRH) or a radio remote unit (RRU). The RRH, the RRU, etc. generally have lower power levels than the BS. At least one antenna is installed in one node. The antenna may mean a physical antenna or may mean an antenna port, a virtual antenna or an antenna group. The node may be referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency (or SCC) is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In this disclosure, a physical downlink control channel (PDCCH) and a physical downlink shared channel (PDSCH) may mean a set of time-frequency resources or a set of resource elements carrying downlink control information (DCI) and downlink data of a physical layer. In addition, a physical uplink control channel, a physical uplink shared channel (PUSCH) and a physical random access channel means a set of time-frequency resources or a set of resource elements carrying uplink control information (UCI), uplink data and random access signals of a physical layer. Hereinafter, a UE transmitting an uplink physical channel (e.g., PUCCH, PUSCH or PRACH) may mean that DCI, uplink data or random access signals are transmitted over or through the uplink physical channel. A BS receiving an uplink physical channel may mean that DCI, uplink data or random access signals are received over or through the uplink physical channel. A BS transmitting a downlink physical channel (e.g., PDCCH or PDSCH) is used as the same meaning as transmission of DCI or uplink data over or through the downlink physical channel. A UE receiving a downlink physical channel may mean that DCI or uplink data is received over or through the downlink physical channel.

In this disclosure, a transport block is a payload for a physical layer. For example, data given to a physical layer from a higher layer or a medium access control (MAC) layer is basically referred to as a transport block.

In the present disclosure, HARQ is a kind of error control technique. A HARQ-ACK transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data. Time delay occurs until ACK/NACK is received from a UE and retransmission data is transmitted after the BS transmits scheduling information and data according to the scheduling information. Such time delay occurs due to channel propagation delay or a time required to decode/encode data. Accordingly, when new data is transmitted after a HARQ process which is currently in progress is finished, a gap occurs in data transmission due to time delay. Accordingly, a plurality of independent HARQ processes is used to prevent a gap from occurring in data transmission during a time delay period. For example, when there are seven transmission occasions between initial transmission and retransmission, a communication device may perform data transmission without a gap by performing seven independent HARQ processes. When a plurality of parallel HARQ processes is used, UL/DL transmission may be continuously performed while waiting for HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier.

For background technologies, terms, abbreviations used in this disclosure, refer to matters described in the standard documents published prior to the present disclosure. For example, documents corresponding to 3GPP TS 36, 24 and 38 series (http://www.3gpp.org/specifications/specification-numbering) may be referred to.

Frame Structure

FIG. 1 is a view showing an example of a frame structure in NR.

The NR system may support a plurality of numerologies. Here, the numerology may be defined by a subcarrier spacing and cyclic prefix (CP) overhead. At this time, a plurality of subcarrier spacings may be derived by scaling a basic subcarrier spacing with an integer N (or μ). In addition, even if it is assumed that a very low subcarrier spacing is not used in a very high carrier frequency, a used numerology may be selected independently of the frequency band of a cell. In addition, in the NR system, various frame structures according to the plurality of numerologies may be supported.

Hereinafter, an orthogonal frequency division multiplexing (OFDM) numerology and a frame structure which may be considered in the NR system will be described. The plurality of OFDM numerologies supported in the NR system may be defined as shown in Table 1. μ and cyclic prefix for a bandwidth part are obtained from RRC parameters provided by the BS.

TABLE 1

| μ | $\Delta f = 2^{\mu} * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports the plurality of numerologies (e.g., subcarrier spacings) supporting various 5G services. For example, when the subcarrier spacing is 15 kHz, a wide area in traditional cellular bands is supported. When the subcarrier spacing is 30 kHz/60 kHz, dense-urban, lower latency and wider carrier bandwidth are supported. When the subcarrier spacing is equal to or higher than 60 kHz, bandwidth greater than 24.25 GHz is supported to overcome phase noise.

Resource Grid

Figure 2:
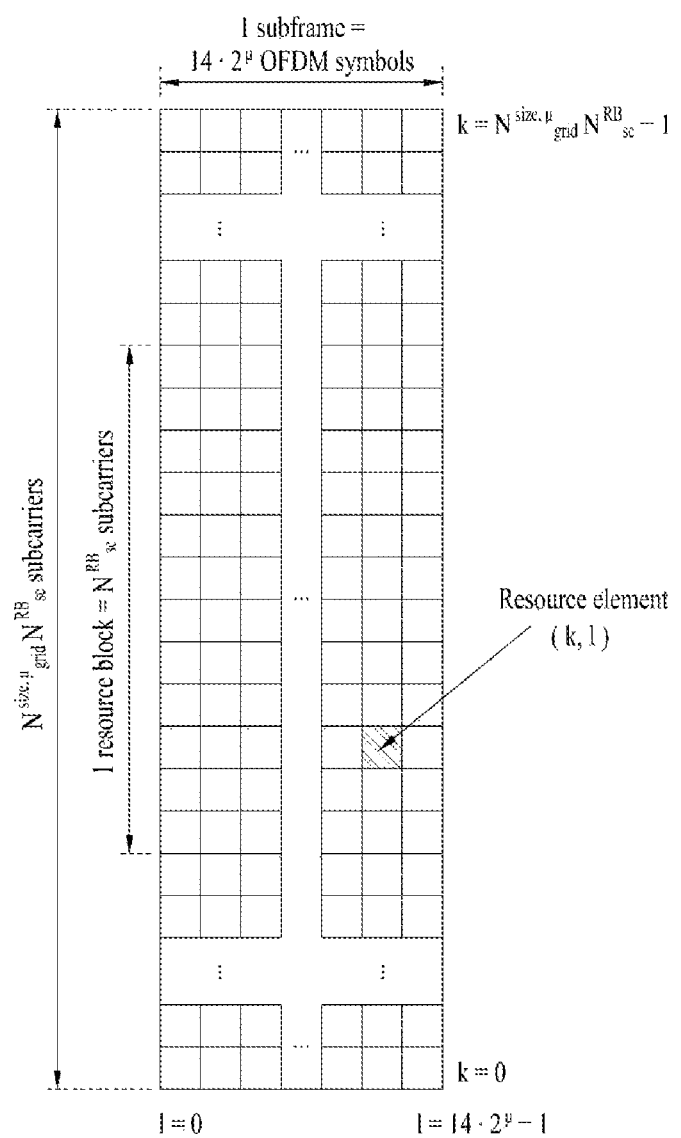
FIG. 2 is a view showing an example of a resource grid in NR.

FIG. 2 is a view showing an example of a resource grid in NR.

Referring to FIG. 2, for each subcarrier spacing setting and carrier, a resource grid of $N^{size,\mu}_{grid} * N^{RB}_{SC}$ subcarriers and $14 \cdot 2^{\mu}$ OFDM symbols is defined. Here, $N^{size,\mu}_{grid}$ is indicated by RRC signaling from the BS. $N^{size,\mu}_{grid}$ may vary according to uplink and downlink as well as the subcarrier spacing setting μ. There is one resource grid for subcarrier spacing setting μ, antenna port p and a transmission direction (uplink or downlink). Each element of the resource grid for subcarrier spacing setting μ and antenna port p is referred to as a resource element and is uniquely identified by an index pair (k,l). Here, k denotes an index in a frequency domain and l denotes a symbol location in the frequency domain relative to a reference point. A resource element (k,l) for subcarrier spacing setting μ and antenna port p correspond to physical resource and complex value $a^{(p,\mu)}_{k,l}$. A resource block (RB) is defined by $N^{RB}_{SC}=12$ consecutive subcarriers in the frequency domain.

Considering that the UE cannot support a wide bandwidth to be supported in the NR system at once, the UE may be configured to operate in a part of the frequency bandwidth of the cell (hereinafter referred to as a bandwidth part (BWP)).

Bandwidth Part (BWP)

In the NR system, up to 400 MHz may be supported per carrier. If a UE operating in such a wideband carrier operates in a state in which a radio frequency (RF) module for the entire carrier is always turned on, UE battery consumption may increase. Alternatively, considering various use cases (e.g., eMBB, URLLC, mMTC, V2X, etc.) in which the UE operates in one wideband carrier, different numerologies (e.g., subcarrier spacings) may be supported for each frequency band in the carrier. Alternatively, capabilities for maximum bandwidth may vary according to UE. In consideration of this, the BS may instruct the UE to operate in a partial bandwidth rather than the entire bandwidth of the wideband carrier, and the partial bandwidth may be referred to as a bandwidth part (BWP). In the frequency domain, the BWP is a subset of contiguous common resource blocks defined for numerology μi in the bandwidth part i on the carrier, and one numerology (e.g., a subcarrier spacing, a CP length, a slot/mini-slot duration) may be set.

Meanwhile, the BS may set one or more BWPs in one carrier set for the UE. Alternatively, when UEs are concentrated on a specific BWP, some UEs may move to another BWP for load balancing. Alternatively, in consideration of frequency domain inter-cell interference cancellation between neighbor cells, some spectrums of the entire bandwidth may be excluded and both BWPs of a cell may be set in the same slot. That is, the BS may set at least one DL/UL BWP for a UE associated with the wideband carrier, and at least one of DL/UL BWP(s) set at a specific time may be activated (by L1 signaling which is a physical layer control signal, a MAC control element (CE) which is a MAC layer control signal, or RRC signaling), switching to another set DL/UL BWP may be indicated (by L1 signaling, MAC CE, or RRC signaling), or a timer value may be set to switch a DL/UL BWP determined by the UE when the timer expires. The activated DL/UL BWP is particularly referred to an active DL/UL BWP. When the UE is in an initial access process or before RRC connection of the UE is established, the UE may not receive a configuration for the DL/UL BWP. In this situation DL/UL BWP assumed by the UE may be referred to as an initial active DL/UL BWP.

Beamforming

Figure 3:
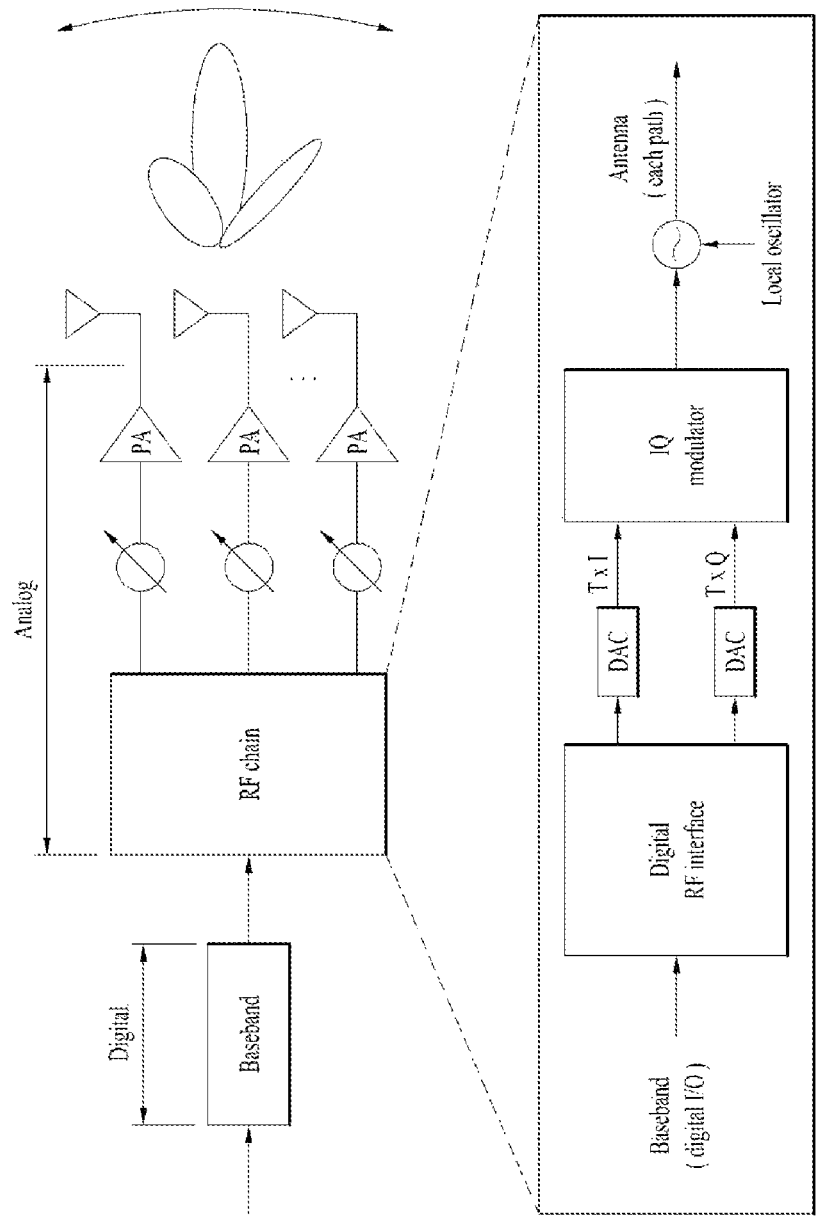
FIG. 3 is a view showing analog beamforming.

FIG. 3 is a block diagram of a transmitter including an analog beamformer and an RF chain. Analog beamforming is a representative beamforming scheme applied to an initial multi-antenna structure. In analog beamforming, analog signals subjected to digital signal processing are branched into a plurality of paths and a beam is formed through phase shift (PS) and power amplifier (PA) setting in each path. Referring to FIG. 3, in analog beamforming, analog signals derived from a single digital signal are processed by a PS and a PA connected to each antenna. That is, in the analog stage, a complex weight is processed by the PS and the PA. Here, the RF chain means a processing block in which a baseband signal is converted into an analog signal. In analog beamforming, beam accuracy is determined according to the characteristics of the elements of the PS and the PA, and is advantageous to narrowband transmission due to the control characteristics of the elements. Meanwhile, due to a hardware structure in which it is difficult to implement multi-stream transmission, multiplexing gain for increasing a transmission rate is relatively small, and beamforming for each user based on orthogonal resource allocation is difficult.

Figure 4:
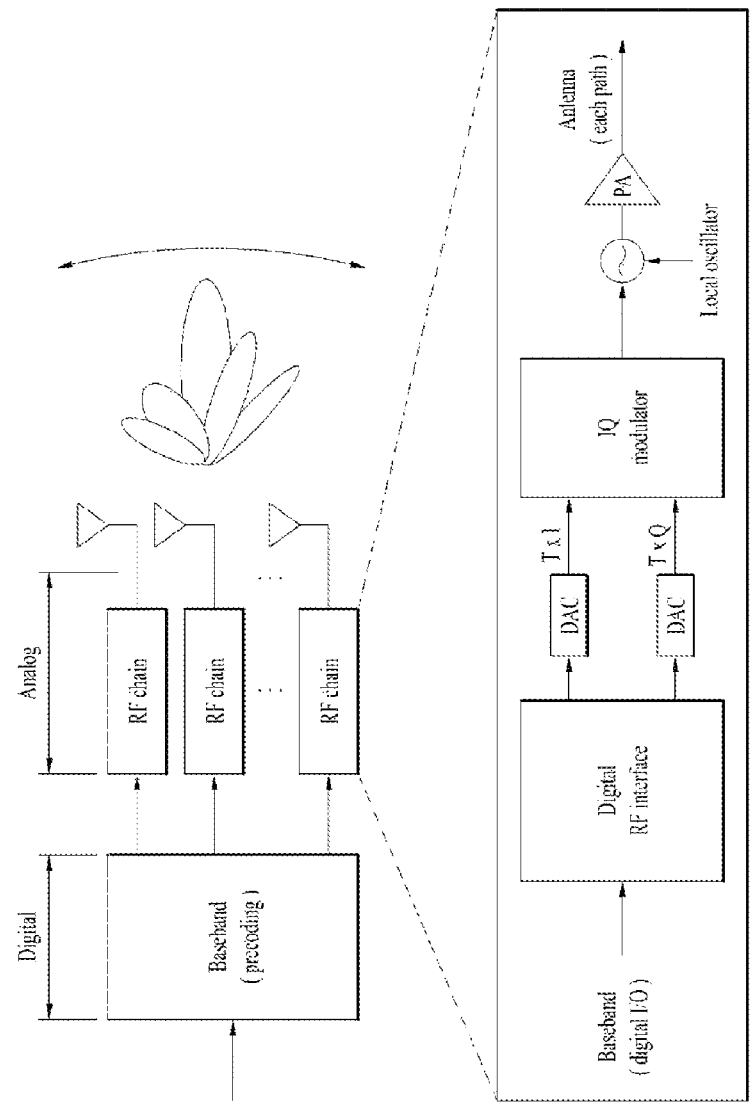
FIG. 4 is a view showing digital beamforming.

FIG. 4 is a block diagram of a transmitter including a digital beamformer and an RF chain. Unlike analog beamforming, in digital beamforming, a beam is formed in a digital stage using baseband processing, in order to maximize diversity and multiplexing gain in a MIMO environment. Referring to FIG. 4, a beam may be formed by performing precoding in baseband processing. The RF chain may include a PA. Therefore, a complex weight derived for beamforming may be directly applied to transmission data. In digital beamforming, since a beam is differently formed for each user, multi-user beamforming may be simultaneously supported. In addition, in digital beamforming, independent beamforming is possible for each user allocated orthogonal resources and scheduling flexibility is high and thus a transmitter suitable for a system purpose may operate. In addition, in digital beamforming, when technology such as MIMO-OFDM is applied in a broadband transmission environment, an independent beam may be formed for each subcarrier. Accordingly, digital beamforming may maximize the maximum transmission rate of a single user based on system capacity increase and enhanced beam gain. Accordingly, in a 3G/4G system, digital beamforming based MIMO technology was introduced.

Meanwhile, massive multiple-input multiple-output (MIMO) in which the number of transmit/receive antennas significantly increases may be considered. In a general cellular system, it is assumed that the maximum number of transmit/receive antennas applied to the MIMO environment is 8. However, in the massive MIMO environment, the maximum number of transmit/receive antennas may increase to several tens or hundreds. In the massive MIMO system, when existing digital beamforming is applied, since digital signal processing for hundreds of transmit antennas is performed through baseband processing, signal processing complexity significantly increases and RF chains corresponding in number to the number of transmit antennas are required, thereby significantly increasing hardware implementation complexity. In addition, since independent channel estimation is required for all transmit antennas and feedback information for a massive MIMO channel composed of all antennas is required in a frequency division duplex (FDD) system, pilot and feedback overhead significantly increase. On the other hand, if existing analog beamforming is applied in the massive MIMO environment, hardware complexity of a transmitter is relatively low, but increase in performance using multiple antennas is small and resource allocation flexibility is poor. In particular, it is difficult to control a beam for each frequency during broadband transmission.

Accordingly, in the massive MIMO environment, rather than using only any one of analog beamforming or digital beamforming as beamforming technology, hybrid beamforming which is a combination of analog beamforming and digital beamforming is required. That is, a hybrid type transmitter structure may be required to reduce hardware implementation complexity of the transmitter according to the characteristics of analog beamforming and to maximize beamforming gain using a large number of transmit antennas according to the characteristics of digital beamforming. Hybrid beamforming aims to construct a transmitter capable of taking advantages of analog beamforming and digital beamforming in the massive MIMO environment.

Figure 5:
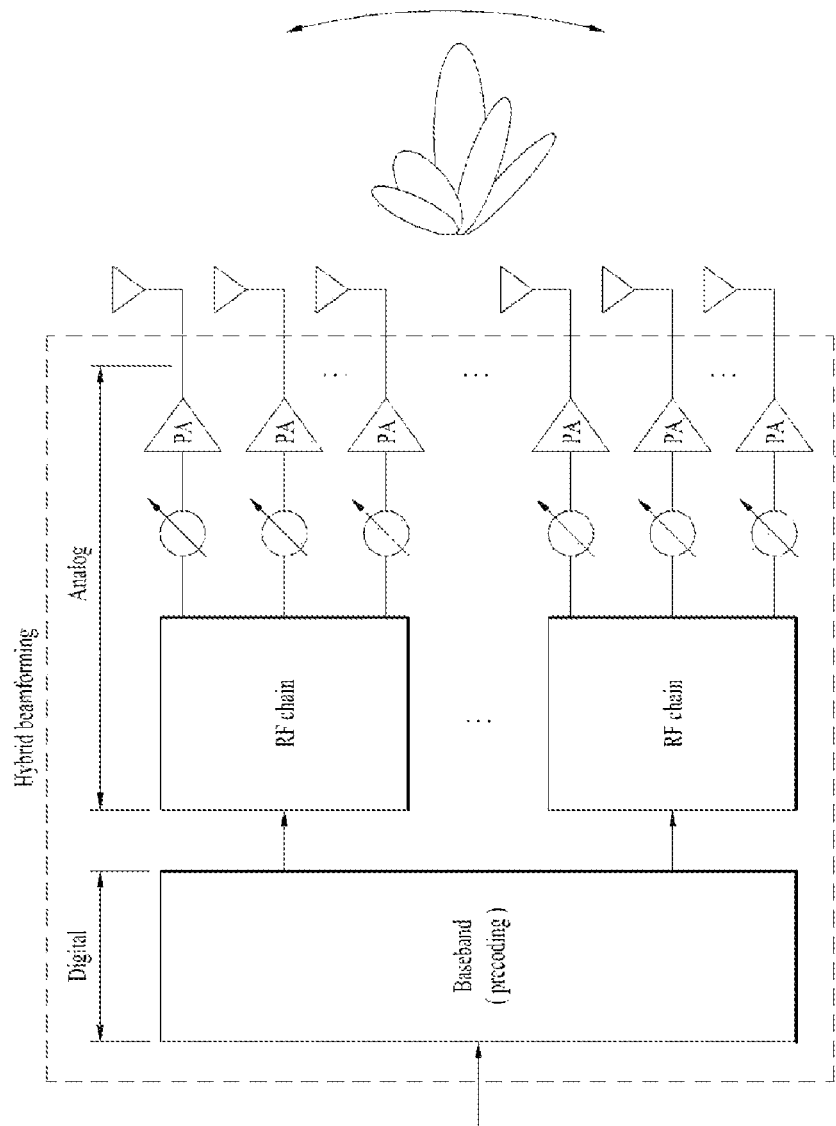
FIG. 5 is a view showing hybrid beamforming.

FIG. 5 is a block diagram of a transmitter including a hybrid beamformer. Referring to FIG. 5, basically, in hybrid beamforming, a coarse beam may be formed through analog beamforming and a beam for multi-stream for multi-user transmission may be formed through digital beamforming. That is, in hybrid beamforming, a structure in which analog beamforming and digital beamforming are simultaneously performed in order to reduce transmitter implementation complexity or hardware complexity is implemented.

Embodiment

Full Duplex Radio (FDR) means that transmission and reception operations may be simultaneously performed in one node (UE or BS, etc.). For FDR, a node may require the ability to eliminate self-interference. A FDR system may be roughly divided into two systems. A first system is a system in which a fixed terminal such as a base station (BS) or an AP has a full duplex function and UEs connected thereto have only a half duplex function. A second system is a complete FDR system in which all UEs, BSs, APs in a network have full duplex capability.

Hereinafter, in the embodiment of the present disclosure, when an uplink UE and a downlink UE coexist as in the first FDR system or flexible duplex, a signal transmission/reception method of maximizing a degree of freedom (DoF) from the viewpoint of a network while efficiently suppressing or eliminating interference between the UEs will be described.

Premise/Assumption and Abbreviation

In the following description, a RE may be replaced by one of a RE group, a symbol, a symbol group, a slot, or a subframe. In addition, the symbol may be a RE unit, a RE group unit or an OFDM symbol unit. Hereinafter, RE sets are two adjacent RE units unless otherwise specified. It is assumed that these REs are separated in time. Depending on implementation, this is applicable to adjacent REs in the frequency domain.

The following description assumes the following system model.

The BS has full duplex capability, has M tx/rx antennas, and has up to L transmission and reception RF chains. That is, it is assumed that, in one unit time/frequency resource or RE, the maximum number of uplink/downlink layers capable of multiplexing is L. At this time, it is assumed that M is equal to or greater than 2L. In a general mmwave system, since the number of RF chains is significantly lower than the number of antennas, the above assumption may be regarded as being valid.

It is assumed that an i-th downlink UE receives $l_i$ layers from the BS. At this time, $$\sum_i l_i \le L.$$

It is assumed that the number of downlink UEs which are simultaneously serviced by the BS is $K_{DL}$. It is assumed that a k-th uplink UE transmits $n_k$ layers to the BS. At this time, $$\sum_k n_k \le L.$$

It is assumed that the number of uplink UEs which are simultaneously serviced by the BS is $K_{UL}$.

Figure 6:
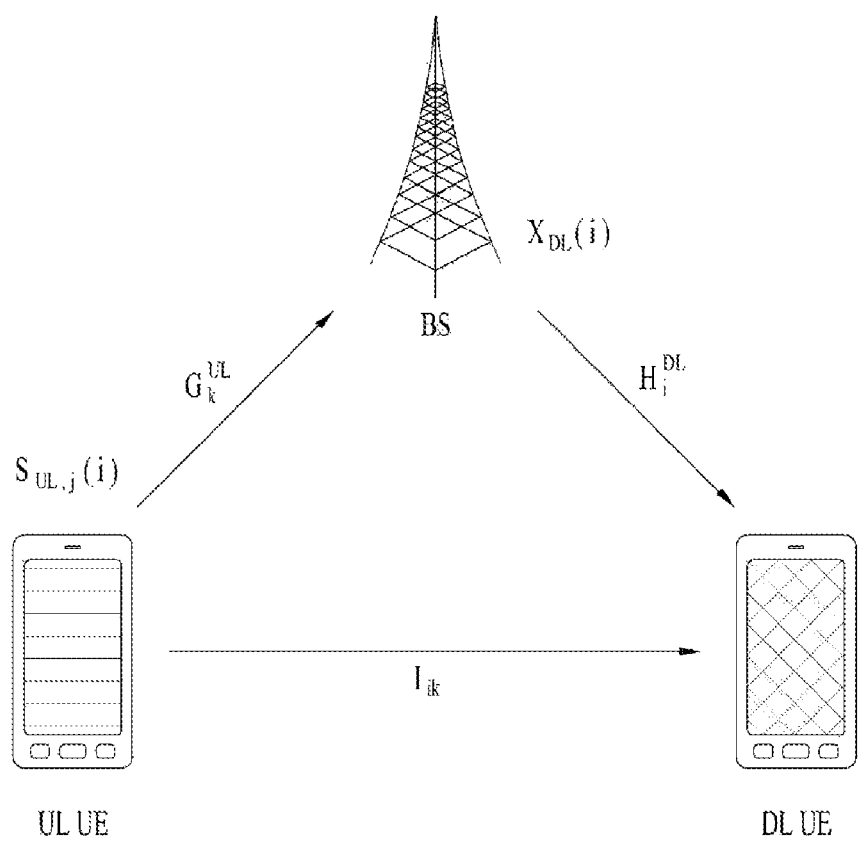
FIG. 6 is a diagram of the above-described parameters.

$X_{DL}$ (i): downlink transmission symbol vector in an i-th RE $S_{UL,j}$ (i) uplink transmission symbol vector transmitted by a j-th UE in the i-th RE $H_i^{DL}$ denotes a downlink channel from the BS to the i-th DL UE $G_k^{UL}$ denotes an uplink channel form a k-th UL UE to the BS $I_{ik}$ denotes a channel from the k-th UL UE to the i-th DL UE FIG. 6 is a diagram of the above-described parameters.

Signal Transmission/Reception of BS

A BS according to an embodiment of the present disclosure may transmit a first RE set including two REs to a UE by respectively applying different precoders to the two REs of the first RE set. While the first RE set is transmitted, a second RE set including two REs may be received from a plurality of UEs including the UE by respectively applying different post-coders to the two REs of the second RE set. The BS has L RF chains and the number of antennas of the BS is equal to or greater than 2L. 2L data may be transmitted in each of the two REs of the first RE set, and the number of plurality of UEs may be 2L.

Here, code Division Multiplexing (CDM) codes are respectively applied to the first RE set transmitted from the BS to the UE in downlink and the second RE set transmitted from the UE to the BS in uplink. That is, the BS performs precoder/beamformer switching in the RE set subjected to CDM at the time of downlink transmission and performs precoder/beamformer switching in the RE set subjected to CDM at the time of uplink signal reception. If the BS is provided with a special type of antenna such as a reconfig-urable antenna (an antenna capable of changing the state of a radio channel using an electromagnetic signal; an analog beamformer may be regarded as a kind of reconfigurable antenna), precoder/beamformer switching may be regarded as switching the state of the reconfigurable antenna (there may be a plurality of states when the change of the radio channel is changed using the electromagnetic signal). When the number of physical antennas is equal to or greater than 2L or when the number of states of the reconfigurable antenna is equal to or greater than 2L, a linearly independent channel state having a size of L may be generated twice through beam/precoder switching during two receptions. Compare to a method of applying precoding for each RE in a conventional half duplex system, as described above, precoding is differently applied in two RE sets at the time of transmission and reception, and CDM is applied to uplink transmission and downlink transmission, thereby eliminating interference by (adjacent) uplink signals affecting downlink signal reception. Hereinafter, in association with signal transmission and reception, CDM, downlink signal transmission, uplink signal reception and DMRS transmission will be sequentially described in detail.

Application of CDM

Figure 7:
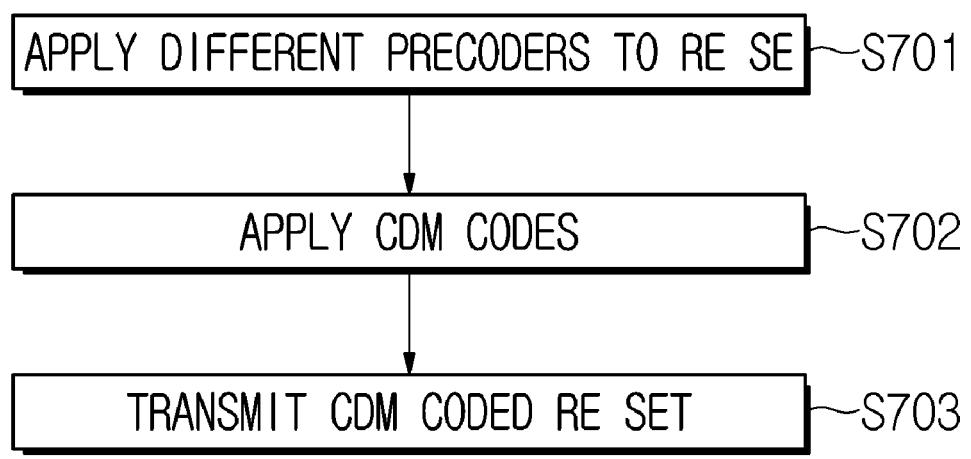
FIG. 7 is a flowchart illustrating an embodiment of the present disclosure.

According to the embodiment of the present disclosure, each RE (or RE unit symbol) of an RE set may be multiplied by a MIMO precoding matrix and then multiplied by a CDM code for avoiding interference of a UL UE (or interference received by an adjacent UE for transmitting an uplink signal when a UE transmits an uplink signal to a BS). That is, as shown in FIG. 7, the BS applies different precoders to the RE set (S701), applies a CDM code (S702), and then transmits a CDM coded RE set (S703).

Unlike conventional CDM for distinguishing among uses, symbols extend using different orthogonal codes with respect to an uplink signal and a downlink signal of FDR. CDM is applicable in RE groups/set units. Since a channel should not be changed while CDM is applied, CDM should be applied by grouping/setting adjacent possible REs and applying orthogonal codes to the REs. For example, orthogonal codes shown in Equation 1 below is used in UL and DL signals during two symbols.

$$C = \begin{bmatrix} c_{11} & c_{12} \\ c_{21} & c_{22} \end{bmatrix} = [c_{DL} \ c_{UL}] \quad \text{Equation 1}$$

C may be a certain type of orthogonal code. For example, a DFT matrix (e.g., [1,1;1,−1]) may be used. At this time, a specific code is applied to a DL transmission symbol and, in the same RE, a UL transmission UE uses a code orthogonal to a DL code. A codeword matrix for a CDM code may be a DFT matrix or an arbitrary complex orthogonal matrix. However, a matrix having a specific element of 0, such as an identity matrix, may not be used.

Meanwhile, the RE set subjected to CDM may be set in advance or signaled by a network. This RE set may be subjected to TDM or FDM. That is, the first RE set and the second RE set may be preset or indicated through higher layer signaling.

Downlink Signal Transmission

As described above, a BS may transmit a first RE set including two REs, by applying different (or linearly independent) precoders to the two REs of the first RE set. Here, each of the different precoders is a 2L*L precoding matrix, and L is the number of layers. The different precoders may be applied to the two REs of the first RE set by joint-precoding a 2L*1 transmission symbol s (s being a 2L*1 downlink transmission symbol vector) in the first RE set through two 2L*L precoding matrices ($W^{-1}$). Here, two 2L*L precoding matrices used for joint precoding correspond to $W^{-1}$ s in the following description.

This will be described in terms of the received signal of an i-th downlink user.

The received signal of the i-th downlink user during two symbols may be expressed as shown in Equation 2.

$$\begin{bmatrix} y_i^{DL}(1) \\ y_i^{DL}(2) \end{bmatrix} = \begin{bmatrix} c_{11}H_i^{DL}P(1) & 0 \\ 0 & c_{21}H_i^{DL}P(2) \end{bmatrix} \begin{bmatrix} x_{DL}(1) \\ x_{DL}(2) \end{bmatrix} + \sum_{k=1}^{K_{UL}} I_{ik} \begin{bmatrix} c_{12} \\ c_{22} \end{bmatrix} s_{UL,k} + \begin{bmatrix} n_i(1) \\ n_i(2) \end{bmatrix}$$

Equation 2 where, n denotes a noise signal and P (x) denotes a downlink precoding vector at an x-th symbol. At this time, when the signal received during two symbols is multiplied by a code used in DL, Equation 3 may be obtained.

$$c_{DL}^H \begin{bmatrix} y_i^{DL}(1) \\ y_i^{DL}(2) \end{bmatrix} = [c_{11}^2 H_i^{DL}P(1) \ c_{21}^2 H_i^{DL}P(2)] \begin{bmatrix} x_{DL}(1) \\ x_{DL}(2) \end{bmatrix} + c_{DL}^H \begin{bmatrix} n_i(1) \\ n_i(2) \end{bmatrix}$$

Equation 3 where, it is assumed that the channel is not changed during two symbols. At this time, when the signals of all downlink UEs are stacked, the following equation is obtained.

$$\underbrace{\begin{bmatrix} c_{11}^2 H_1^{DL}P(1) & c_{21}^2 H_1^{DL}P(2) \\ c_{11}^2 H_2^{DL}P(1) & c_{21}^2 H_2^{DL}P(2) \\ \vdots & \vdots \\ c_{11}^2 H_{K_{DL}}^{DL}P(1) & c_{11}^2 H_{K_{DL}}^{DL}P(2) \end{bmatrix}}_{W} \underbrace{\begin{bmatrix} x_{DL}(1) \\ x_{DL}(2) \end{bmatrix}}_{x} + \begin{bmatrix} c_{11}n_1(1) + c_{21}n_1(1) \\ c_{11}n_2(1) + c_{21}n_2(1) \\ \vdots \\ c_{11}n_{K_{DL}}(1) + c_{21}n_{K_{DL}}(1) \end{bmatrix}$$

Equation 4 where, if the rank of W becomes min(N,2L) (here, N is a sum of receive antennas or reception RF chains of the downlink UE), X of 2L*1 may be successfully decoded. In general, it may be assumed that N is equal to or greater than 2L. P is a beamforming matrix of a M*L dimension. If M is greater than or equal to 2L, the rank of W may become min(N,2L)=2L. Accordingly, the assumption that M is greater than or equal to 2L is necessary.

At this time, in order to have full degrees of freedom in multiuser MIMO, the precoding matrix of x in 2 symbol durations becomes a ZF beamforming matrix as follows.

$$x = \begin{bmatrix} x_{DL}(1) \\ x_{DL}(2) \end{bmatrix} = W^{-1}s = Ts$$

Equation 5 where, the precoding matrix, by which the downlink transmission symbol vector s of a 2L dimension is multiplied, is merely an example, and other matrices may be used according to implementation of the BS. For example, a MMSE beamforming matrix, a regularized zero-forcing matrix or a matrix for maximizing a signal to leakage plus noise ratio (SLNR) may be used.

In the existing DL MIMO, L ports are configured to transmit L layers per RE. However, in the proposed method, 2L DMRS ports need to be configured.

The transmission symbol vector in the RE set is jointly (MIMO) precoded. At this time, the precoding matrix may be determined to maximize the transmission rate in effective composite channels of the REs in the RE set.

In the existing method, the precoding matrix is generated for each RE, and the transmission symbol vector is generated for each RE, multiplied by the precoding matrix and transmitted in each RE. However, in the proposed method, the transmission symbol vector in the RE set is jointly precoded, distributed in the REs of the RE set, and transmitted.

Uplink Signal Reception (Uplink Signal Transmission of UE)

As described above, while a BS transmits a first RE set to a UE by applying different precoders to two REs of the first RE set, the BS may receive a second RE set including two REs from a plurality of UEs including the UE, by applying different post-coders to the two REs of the second RE set.

An uplink reception signal during two symbols may be used as follows.

$$\sum_{k=1}^{K_{UL}} \begin{bmatrix} R(1)G_k^{UL} & 0 \\ 0 & R(2)G_k^{UL} \end{bmatrix} \begin{bmatrix} c_{12} \\ c_{22} \end{bmatrix} s_{UL,k} + \begin{bmatrix} R(1)n(1) \\ R(2)n(2) \end{bmatrix}$$

Equation 6 where, R(i) denotes a reception post-coding/reception beamforming matrix at an i-th symbol, and R denotes an L*M matrix. When Equation 6 above is summarized again with respect to K uplink UEs (a plurality of UEs), the following equation may be obtained.

Equation 7

$$\begin{bmatrix} y^{UL}(1) \\ y^{UL}(2) \end{bmatrix} = \underbrace{\begin{bmatrix} c_{12}R(1)G_1^{UL} & c_{12}R(1)G_2^{UL} & \cdots & c_{12}R(1)G_{K_{UL}}^{UL} \\ c_{22}R(2)G_1^{UL} & c_{22}R(2)G_2^{UL} & \cdots & c_{22}R(2)G_{K_{UL}}^{UL} \end{bmatrix}}_{\Gamma} \underbrace{\begin{bmatrix} s_{UL,1} \\ s_{UL,2} \\ \vdots \\ s_{UL,K_{UL}} \end{bmatrix}}_{z} + \begin{bmatrix} R(1)n(1) \\ R(2)n(2) \end{bmatrix}$$

(7)

where, z is 2L*1. In R, if M is equal to or greater than 2L and R(1) and R(2) are independent, Γ may have a rank of min (2L, M). That is, up to 2L DoF may be achieved during two symbol durations, which means that L DoF may be achieved in one symbol duration.

For the above-described downlink transmission and/or the uplink reception of the BS and/or the uplink transmission of the UE, the following details of the uplink UE and BS are necessary.

1) If it is assumed that L signals are received in one RE in the existing UL MIMO, 2L signals are received in the RE set in the proposed method.

2) The plurality of UEs, that is, each UL UE, performs CDM with respect to a transmitted signal in a specific RE set and transmit the signal.

3) The BS performs a reception beam switching or reception post coding matrix switching while the signal in the RE set is received.

4) When the BS receives $n_k$ layers from an individual UE per RE, a RS is allocated $2*n_k$ RS ports.

5) If the REs in the RE set is subjected to TDM and the BS switches an analog beamforming direction, RSs according to different reception beams should be subjected to TDM.

As to DMRS

Hereinafter, how to configure transmission of a DMRS necessary for the above-described downlink transmission will be described.

If the REs in the RE set are transmitted on different symbols and different analog beamforming matrices are applied to the different symbols, L port DMRSs needs to be configured in one DMRS symbol. In the current NR, one DMRS port may be configured at one symbol or two symbols. In the proposed method, if analog beamforming is applied to the REs in the RE set, it should be assumed that symbols configured with the DMRS port use the same analog beamforming. Accordingly, in the case of 2 port DMRS, the REs in the symbol in which the DMRS is transmitted use the same analog beam and the RE set may be paired and set in a symbol in which a new DMRS port is transmitted. In addition, which PDSCH symbol is associated with which DMRS symbol (port) may be signaled by the BS through a physical layer or higher layer signal or whether each PDSCH symbol and a DMRS symbol are associated may be predetermined. Here, association may be information indicating whether the same analog beamforming is assumed or by which DMRS the used channel information is estimated. In this case, a rule may be determined such that an even number of PDSCH symbols is configured or a non-paired symbol is transmitted by repeating one of the previous symbols if an odd number of PDSCHs is configured, or puncturing or rate matching is performed.

Different digital beamforming may be applied to the REs in the RE set. In this case, instead of constraints for analog beamforming, with which DMRS port each RE is associated may be predetermined or signaled by the BS through a physical layer or higher layer signal.

In summary, a downlink UE transmits two adjacent REs, to which a CDM code is applied, and the precoding matrix of the downlink UE is transmitted over two symbols by jointly precoding a vector of a 2L dimension. (Two adjacent REs, to which the CDM code is applied, are transmitted to the downlink UE, the precoding matrix for transmission to the downlink UE includes two [2L*L] vectors, and two symbols (REs) are jointly precoded and transmitted.) P may be analog or digital beamforming. At this time, the important thing is that P is linearly independently changed during two symbols. For example, an analog beamforming direction may be changed during two symbols.

By the above-described configuration, in downlink, a maximum of min(N, 2L) degrees of freedom may be achieved during two symbols without interference of the uplink signal, which means that L degrees of freedom (DoF) are achieved during one symbol. More specifically, up to 2L streams are scheduled in uplink, but a maximum DoF for each UE halves. Accordingly, the maximum DoF of each UE is reduced but the number of UEs scheduled simultaneously is increased, thereby preventing DoF reduction from the viewpoint of a network. In addition, in downlink, up to 2L data is transmitted on one RE. Accordingly, when the BS has L transmission/reception RF chains, a maximum 2L uplink/downlink DOF may be achieved using the proposed method.

In addition, since CDM signal transmission and reception are performed between the uplink and downlink UEs (between downlink and uplink signals), interference between UEs is eliminated by the code, channel estimation and multi-antenna interference cancellation/suppression scheme are not unnecessary for cancellation of interference between UEs. That is, the maximum DoF may be achieved without channel estimation and multi-antenna interference cancellation/suppression scheme between the UEs from the viewpoint of the network.

That is, in the proposed method, when the BS has L downlink RF chains, L DoF may be achieved through CDM between DL and UL without uplink interference, joint precoding of the downlink symbol vector during two symbols and beam (precoder switching.

Figure 8:
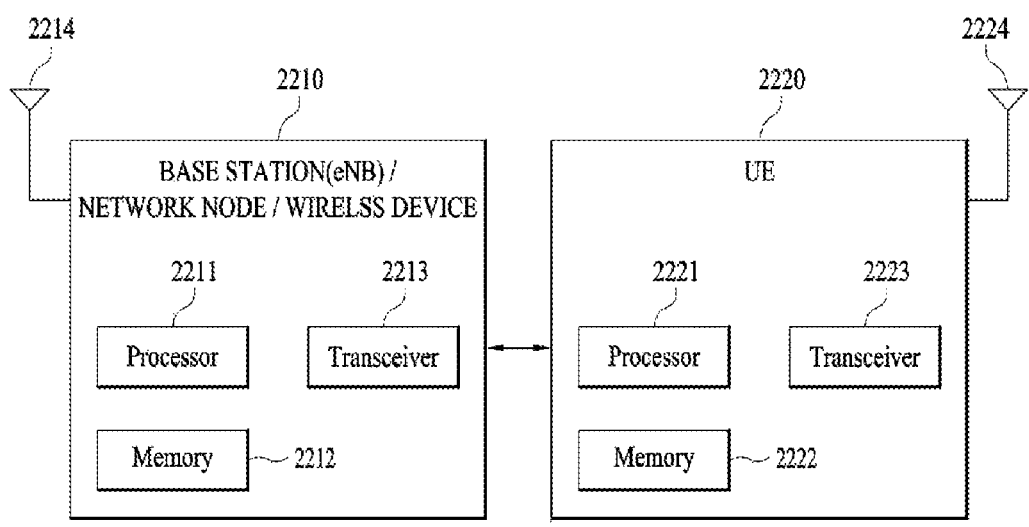
FIG. 8 is a block diagram of wireless communication devices according to an embodiment of the present disclosure.

Configuration of Apparatus According to the Embodiment of the Present Disclosure FIG. 8 is a block diagram of wireless communication devices according to an embodiment of the present disclosure.

Referring to FIG. 8, a wireless communication system may include a BS 2210 and a UE 2220. The UE 2220 may be located within the coverage of the BS. In some embodiments, the wireless communication system may include a plurality of UEs. Referring to FIG. 8, although the BS 2210 and the UE 2220 are illustrated, the present disclosure is not limited thereto. For example, the BS 2210 may be replaced with a network node, a UE, a wireless device, or the like. Alternatively, each of the BS and the UE may be represented as a wireless communication device or a wireless device.

The UE 2220 may include at least one processor 2221, at least one memory 2222, and at least one transceiver 2223. The processor 2211 may perform necessary processing in each embodiment in order to implement functions, procedures, or methods described in the above-described embodiments. One or more protocols may be implemented by the processor 2221. For example, the processor 2221 may implement one or more layers (e.g., functional layers) of a radio interface protocol. The memory 2222 is connected to the processor 2221 and stores various types of information and/or instructions. The transceiver 2223 is electrically connected to the processor 2221 and may be controlled by the processor 2221 to transmit and/or receive radio signals.

Specifically, the processor 2221 receives, from the BS, a first RE set including two REs, to which different precoders are applied, and transmits, to the BS, a second RE set including two REs while the first RE set is transmitted. Code Division Multiplexing (CDM) codes are respectively applied to the first RE set transmitted from the BS to the UE in downlink and the second RE set transmitted from the UE to the BS in uplink.

The BS 2210 may include at least one processor 2211, at least one memory 2212, and at least one transceiver 2213. The processor 2211 may perform necessary processing in each embodiment in order to implement functions, procedures, or methods described in the above-described embodiments.

Specifically, the processor 2221 transmits, to the UE, a first RE set including two REs, by applying different precoders to the two REs of the first RE set, and receives, from a plurality of UEs including the UE, by applying different post-coders to the two REs of the second RE set while the first RE set is transmitted. Code Division Multiplexing (CDM) codes are respectively applied to the first RE set transmitted from the BS to the UE in downlink and the second RE set transmitted from the UE to the BS in uplink.

One or more protocols may be implemented by the processor 2211. For example, the processor 2211 may implement one or more layers (e.g., functional layers) of a radio interface protocol. The memory 2212 is connected to the processor 2211 and stores various types of information and/or instructions. The transceiver 2213 is electrically connected to the processor 2211 and may be controlled by the processor 2211 to transmit and/or receive radio signals.

The memories 2212 and/or 2222 may be disposed inside or outside the processors 2211 and/or 2221, respectively, and may be connected to the processor using various technologies such as wired or wireless connections.

The BS 2210 and/or the UE 2220 may have a single antenna or multiple antennas. For example, antennas 2214 and/or 2224 may be configured to transmit and receive radio signals.

Figure 9:
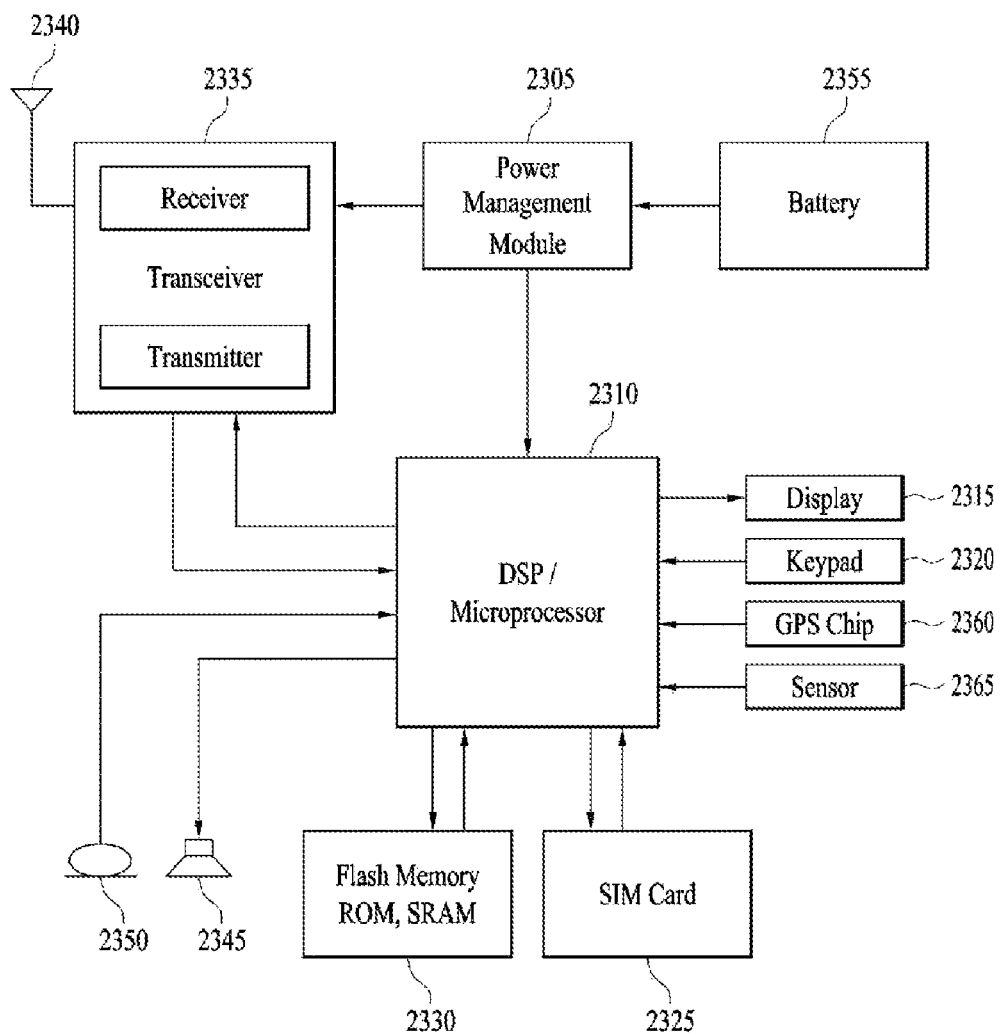
FIG. 9 is a view briefly showing a wireless communication device according to an embodiment of the present disclosure.

FIG. 9 shows one example of an implementation of a wireless communication device according to an implementation of the present disclosure.

Particularly, FIG. 9 is a diagram illustrating an example of the UE 2220 shown in FIG. 8 in more detail. However, the wireless communication device in FIG. 9 is not limited to the UE 2220, and the wireless communication device may be any suitable mobile computing device that is configured to implement one or more implementations of the present disclosure, such as a vehicular communication system or device, a wearable device, a laptop, a smartphone, and so on.

Referring to the example of FIG. 9, the UE 2220 includes at least one processor (e.g., digital signal processor: DSP, or Microprocessor) such as a processor 2310, a transceiver 2335, a power management module 2305, an antenna 2340, a battery 2355, a display 2315, a keypad 2320, a Global Positioning System (GPS) chip 2360, a sensor 2365, a memory 2330, a Subscriber Identification Module (SIM) card 2325 (which may be optional), a speaker 2345 and a microphone 2350. The UE 2220 may include a single antenna or multiple antennas.

The processor 2310 may be configured to implement the functions, procedures and/or methods described in FIGS. 1 to 21 of the present disclosure. In some implementations, the processor 2310 may implement one or more protocols, such as layers (e.g., functional layers) of a wireless interface protocol.

The memory 2330 is connected to the processor 2310 and stores information related to operations of the processor 2310. The memory 2330 may be located inside or outside the processor 2310 and may be connected to the processors through various techniques, such as wired or wireless connections.

A user may enter various types of information (e.g., instructional information such as a telephone number), by various techniques, such as by pushing buttons of the keypad 2320 or by voice activation using the microphone 2350. The processor 2310 receives and processes the user's information and performs the appropriate function(s), such as dialing the telephone number. In some scenarios, data (e.g., operational data) may be retrieved from the SIM card 2325 or the memory 2330 to perform the function(s). In some scenarios, the processor 2310 may receive and process GPS information from a GPS chip 2360 to perform functions related to a position or a location of a UE, such as vehicle navigation, a map service, and so on. In some scenarios, the processor 2310 may display these various types of information and data on the display 2315 for the user's reference and convenience.

The transceiver 2335 is connected to the processor 2310, transmits and/or receives a wireless signal, such as an RF (Radio Frequency) signal. The processor 2310 may control the transceiver 2335 to initiate communication and to transmit radio signals including various types of information or data, such as voice communication data. The transceiver 2335 includes a receiver and a transmitter to receive and transmit radio signals. An antenna 2340 facilitates the transmission and reception of radio signals. In some implementations, upon receiving radio signals, the transceiver 2335 may forward and convert the signals to baseband frequency for processing by the processor 2310. The processed signals may be processed according to various techniques, such as being transformed into audible or readable information to be output via the speaker 2345.

In some implementations, a sensor 2365 may be coupled to the processor 2310. The sensor 2365 may include one or more sensing devices configured to detect various types of information including, but not limited to, speed, acceleration, light, vibration, proximity, location, image and so on. The processor 2310 may receive and process sensor information obtained from the sensor 2365 and perform various types of functions, such as a collision avoidance, autonomous driving and so on.

In the example of FIG. 9, various components (e.g., a camera, a Universal Serial Bus (USB) port, etc.) may be further included in the UE. For example, a camera may be further coupled to the processor 2310 and may be used for various services such as autonomous driving, a vehicle safety service and so on. As such, FIG. 9 is an example of a UE, and implementations are not limited thereto. For example, some components, e.g., a keypad 2320, a Global Positioning System (GPS) chip 2360, a sensor 2365, a speaker 2345 and/or a microphone 2350, may not be implemented in a UE in some scenarios.

Figure 10:
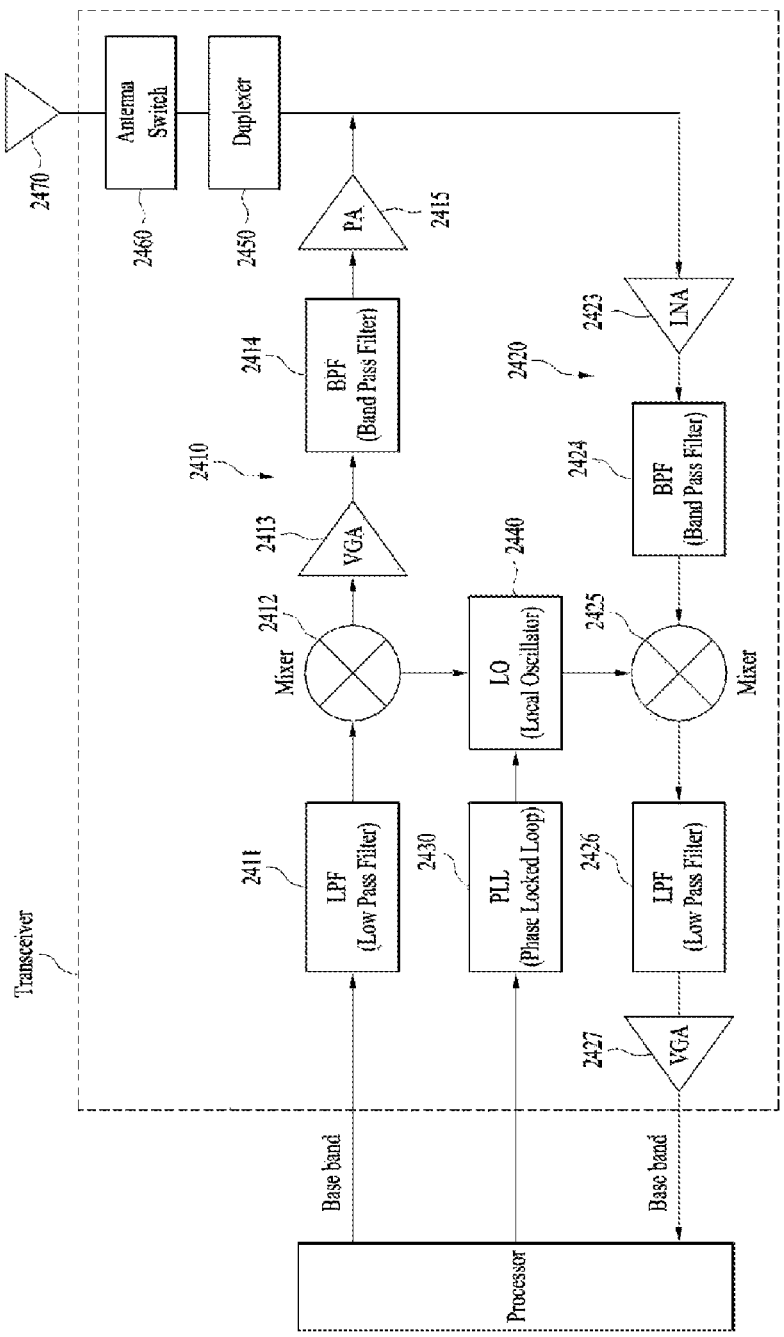
FIG. 10 is a block diagram briefly showing a transceiver of a wireless communication device.

FIG. 10 shows an example of a transceiver of a wireless communication device according to some implementations.

Particularly, FIG. 10 shows an example of a transceiver that may be implemented in Frequency Division Duplex (FDD) system.

In a transmit path, at least one processor, such as the processor described in FIGS. 19 and 20, may process data to be transmitted and may provide a signal, such as an analog output signal, to a transmitter 2410.

In this example, at the transmitter 2410, the analog output signal is filtered by a low pass filter (LPF) 2411, for example to remove artifacts caused by prior digital-to-analog conversion (ADC), is upconverted from baseband to RF by an upconverter (e.g., mixer) 2412, and is amplified by an amplifier such as a variable gain amplifier (VGA) 2413. The amplified signal is filtered by a filter 2414, further amplified by a power amplifier (PA) 2415, routed through duplexer(s) 2450/antenna switch(s) 2460, and transmitted via an antenna 2470.

In the receive path, an antenna 2470 receives signals from a wireless environment, and the received signals are routed through antenna switch(s) 2460/duplexer(s) 2450 and provided to the receiver 2420.

In this example, at the receiver 2420, the received signal is amplified by an amplifier such as a low noise amplifier (LNA) 2423, filtered by a band pass filter 2424, and down-converted from RF to baseband by a downconverter (e.g., mixer) 2425.

The downconverted signal is filtered by a low pass filter (LPF) 2426, and amplified by an amplifier such as a VGA 2427 to obtain an analog input signal, which is provided to at least one processor, such as the processor described in FIG. 8 and FIG. 9.

Further, a local oscillator (LO) generator 2440 generates and provides transmission and reception LO signals to the upconverter 2412 and downconverter 2425, respectively.

Implementations are not limited to the particular arrangement shown in FIG. 10, and various components and circuits may be arranged differently from the example shown in FIG. 10.

Figure 11:
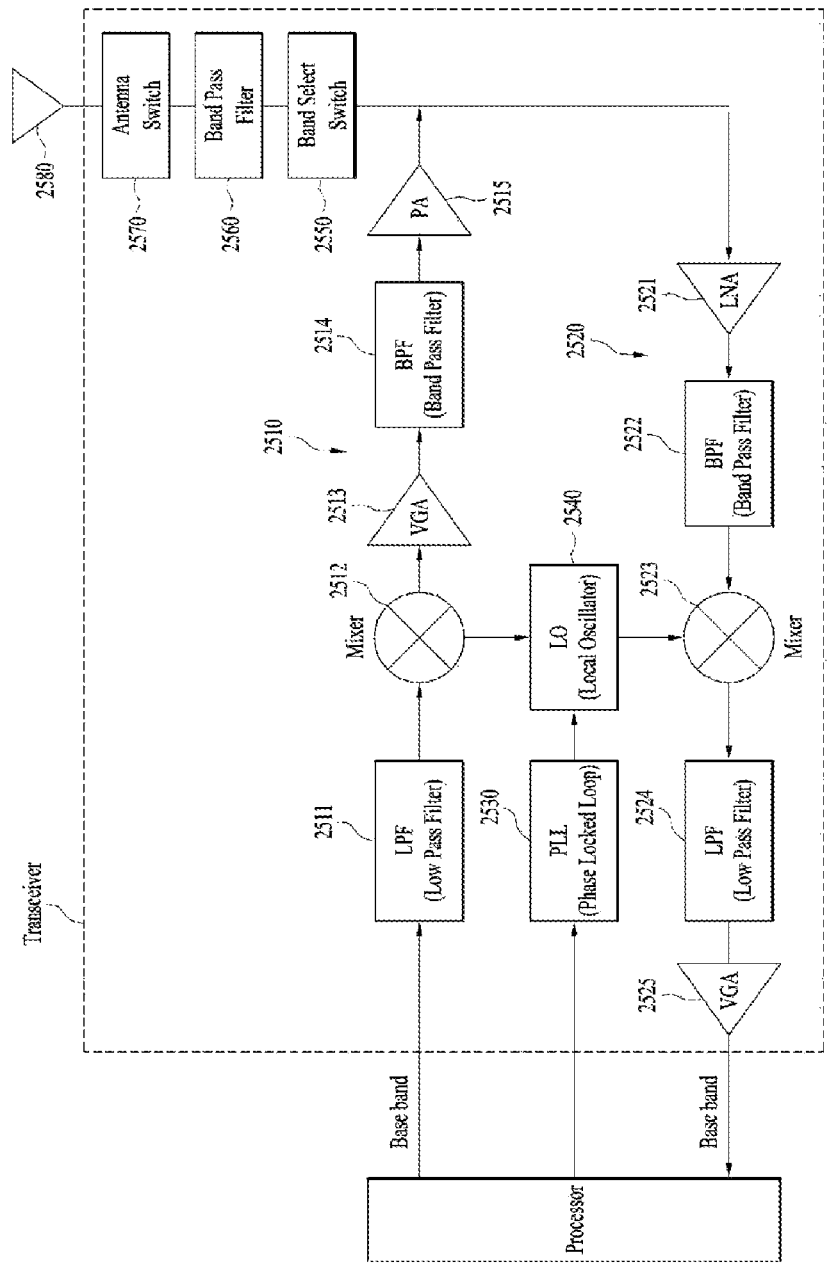
FIG. 11 is a block diagram briefly showing another embodiment of a transceiver of a wireless communication device.

FIG. 11 shows another example of a transceiver of a wireless communication device according to implementations of the present disclosure.

Particularly, FIG. 11 shows an example of a transceiver that may be implemented in a Time Division Duplex (TDD) system.

In some implementations, the transmitter 2510 and the receiver 2520 of the transceiver in the TDD system may have one or more similar features as the transmitter and the receiver of the transceiver in the FDD system. Hereinafter, the structure of the transceiver of the TDD system is described.

In the transmit path, a signal amplified by a power amplifier (PA) 2515 of a transmitter is routed through a band select switch 2550, a band pass filter (BPF) 2560, and an antenna switch(s) 2570, and transmitted via an antenna 2580.

In the receive path, the antenna 2580 receives signals from a wireless environment and the received signals are routed through the antenna switch(s) 2570, the band pass filter (BPF) 2560, and the band select switch 2550, and provided to the receiver 2520.

Figure 12:
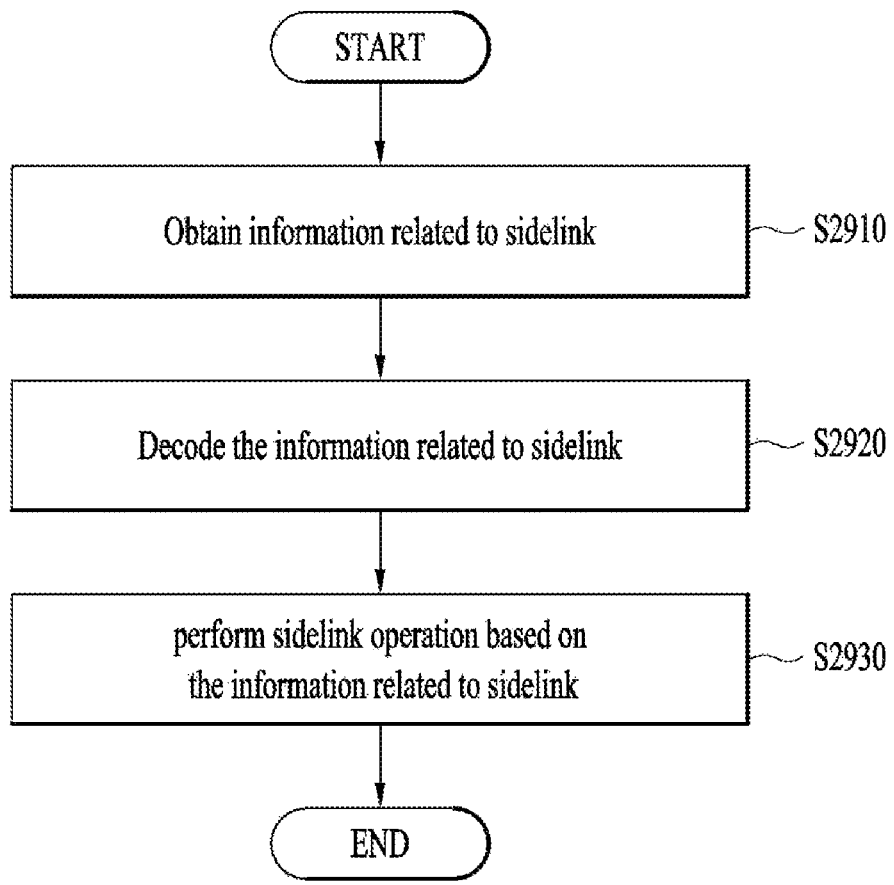
FIG. 12 is a flowchart illustrating wireless device operation related to sidelink.

FIG. 12 shows an example of wireless device operation related to a sidelink.

Referring to FIG. 12, the wireless device obtains information related to a sidelink (S2910). The information related to the sidelink may be one or more resource configuration(s). The information related to the sidelink may be obtained from another wireless device or from a network node.

After obtaining the information, the wireless device decodes the information related to the sidelink (S2920).

After decoding the information related to the sidelink, the wireless device performs one or more sidelink operations based on the information related to the sidelink (S2930). Herein, the sidelink operation(s) performed by the wireless device may be one or more operations described herein.

The wireless device operation related to a sidelink disclosed in the FIG. 12 is merely an example, and sidelink operations using various techniques may be performed by the wireless device. A sidelink may be UE to UE interface for sidelink communication and/or sidelink discovery. A sidelink may correspond to the PC5 interface. In a broad sense, a sidelink operation may be transmission/reception of information between UEs.

Figure 13:
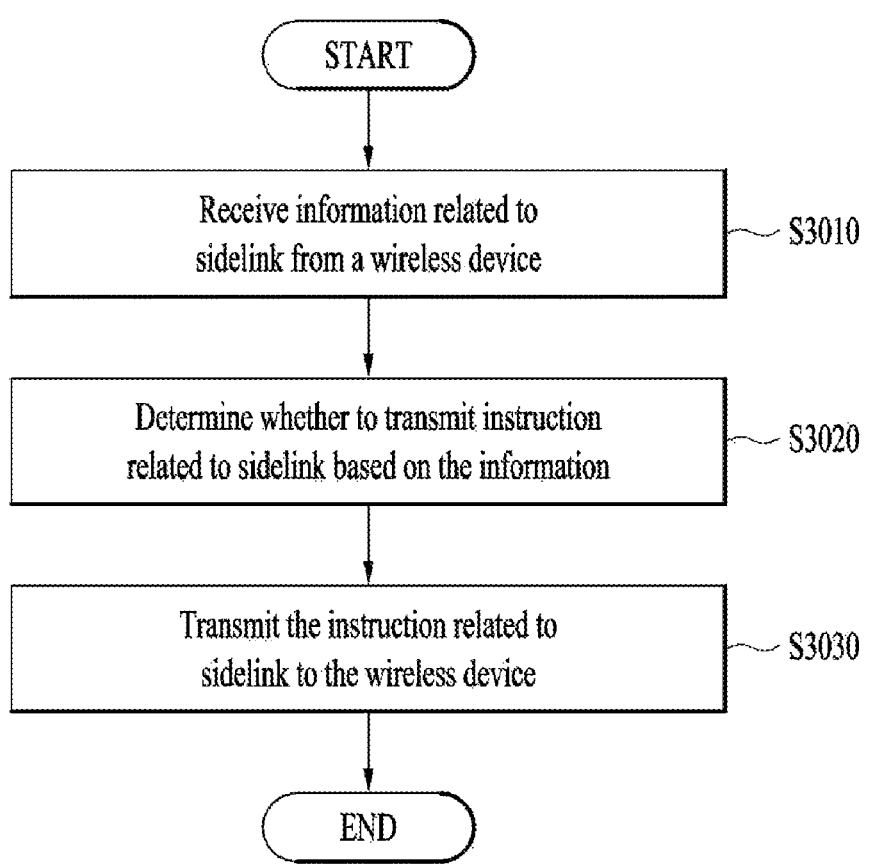
FIG. 13 is a flowchart illustrating network node operation related to sidelink.

FIG. 13 shows an example of network node operation related to a sidelink.

The network node operation related to the sidelink disclosed in the FIG. 13 is merely an example, and sidelink operations using various techniques may be performed by the network node.

The network node receives information related to a sidelink from a wireless device (S3010). For example, the information related to the sidelink may be 'SidelinkUEInformation' which is used for the indication of sidelink information to the network node.

After receiving the information, the network node determines whether to transmit one or more instructions related to the sidelink based on the received information (S3020).

Based on the network node determining to transmit the instruction(s), the network node transmits the instruction(s) related to the sidelink to the wireless device (S3030). In some implementations, after receiving the instruction transmitted by the network node, the wireless device may perform one or more sidelink operation(s) based on the received instruction.

Figure 14:
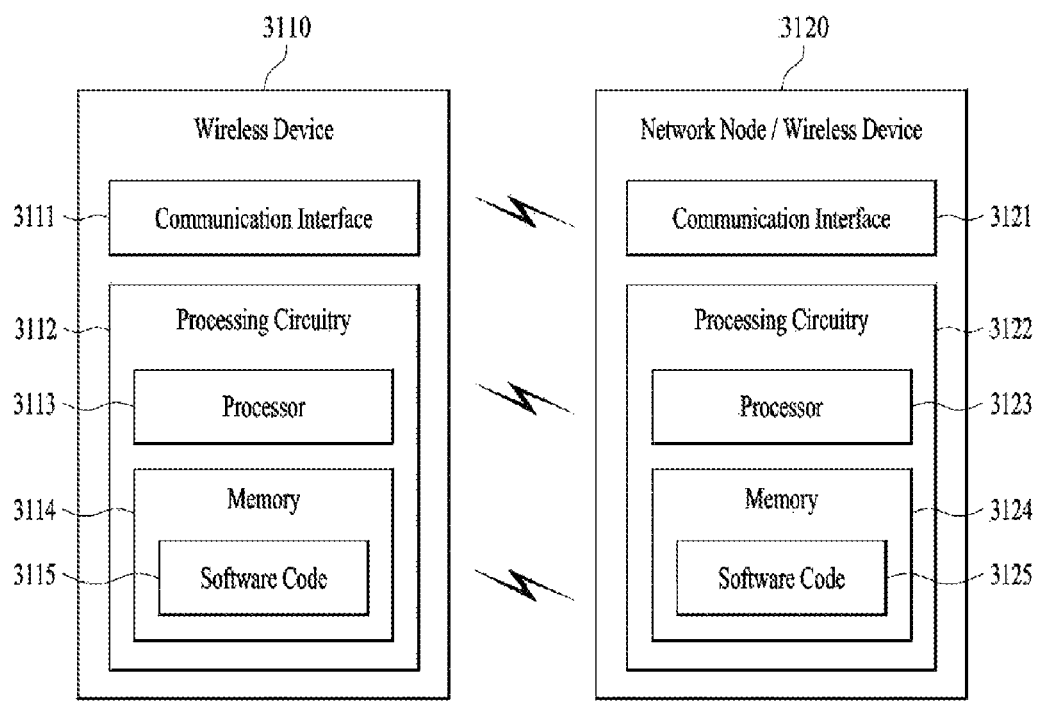
FIG. 14 is a block diagram briefly showing the configuration of a wireless device and a network node.

FIG. 14 is a block diagram illustrating an example of communications between a wireless device 3110 and a network node 3120. The network node 3120 may be replaced by a wireless device or a UE in FIG. 14.

In this example, the wireless device 3110 includes a communication interface 3111 for communicating with one or more other wireless devices, with network nodes, and/or with other elements in the network. The communication interface 3111 may include one or more transmitters, one or more receivers, and/or one or more communications interfaces. The wireless device 3110 includes a processing circuitry 3112. The processing circuitry 3112 may include at least one processor such as a processor 3113 and at least one memory device such as memory 3114.

The processing circuitry 3112 may be configured to control any of the methods and/or processes described herein and/or to cause such methods and/or processes to be performed, e.g., by the wireless device 3110. The processor 3113 corresponds to one or more processors for performing wireless device functions described herein. The wireless device 3110 includes a memory 3114 that is configured to store data, programmatic software code and/or other information described herein.

In one or more implementations, the memory 3114 is configured to store software code 3115 including instructions that, when executed by at least one processor such as a processor 3113, causes the processor 3113 to perform some or all of the processes discussed in detail with respect to FIG. 12 and implementations discussed herein.

For example, one or more processes involving transmission or reception of information may be performed by at least one processor, such as a processor 3113, controlling one or more transceivers, such as a transceiver 2223 in FIG. 9, to transmit or receive the information.

The network node 3120 includes a communication interface 3121 for communicating with one or more other network nodes, wireless devices, and/or other elements in network. Herein, the communication interface 3121 includes one or more transmitters, one or more receivers, and/or one or more communications interfaces. The network node 3120 includes a processing circuitry 3122. Herein, processing circuitry includes a processor 3123 and a memory 3124.

For example, one or more processes involving transmission or reception of information may be performed by at least one processor, such as a processor 3123, controlling one or more transceivers, such as a transceiver 2213 in FIG. 9, to transmit or receive the information.

The implementations of the present disclosure may be achieved by various techniques, for example, hardware, firmware, software, or a combination thereof.

In a hardware configuration, the methods according to the implementations of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

As described above, the detailed description of the examples of the present disclosure has been given to enable those skilled in the art to implement and practice the disclosure. Although the disclosure has been described with reference to exemplary examples, those skilled in the art will appreciate that various modifications and variations can be made in the present disclosure without departing from the spirit or scope of the disclosure described in the appended claims. For example, those skilled in the art may use the constructions of the above-described embodiments in a combination manner. Accordingly, the disclosure should not be limited to the specific examples described herein, but should be accorded the broadest scope consistent with the principles and novel features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The invention claimed is:

1. A method of transmitting and receiving a signal of a base station to a user equipment (UE) full duplex in a wireless communication system, the method comprising:
   transmitting a first resource element (RE) set including two REs to the UE based on different precoders to the two REs of the first RE set; and
   receiving a second RE set including two REs from a plurality of UEs including the UE while the first RE set is transmitted based on different post-coders to the two REs of the second RE set,
   wherein code division multiplexing (CDM) codes are applied to the first RE set transmitted from the base station to the UE in downlink and the second RE set transmitted from the UE to the base station in uplink,
   wherein each of the different precoders is a 2L*L precoding matrix, where L is a number of layers, and
   wherein the different precoders are respectively applied to the two REs of the first RE set by jointly precoding 2L*1 transmission symbols in the first RE through two 2L*L precoding matrices.

2. The method of claim 1, wherein the different precoders are linearly independent.

3. The method of claim 1, wherein 2L data is transmitted in each of the two REs of the first RE set.

4. The method of claim 1, wherein the number of plurality of UEs is 2L.

5. The method of claim 4, wherein a number of antennas of the base station is equal to or greater than 2L.

6. The method of claim 1, wherein the base station has L radio frequency (RF) chains.

7. The method of claim 1, wherein the first RE set and the second RE set are preset or indicated through higher layer signaling.

8. A method of transmitting and receiving a signal of a user equipment (UE) supporting full duplex to a base station in a wireless communication system, the method comprising:
   receiving, from the base station, a first resource element (RE) set including two REs, to which different precoders are applied; and
   transmitting, to the base station, a second RE set including two REs while the first RE set is transmitted,
   wherein code division multiplexing (CDM) codes are respectively applied to the first RE set transmitted from the base station to the UE in downlink and the second RE set transmitted from the UE to the base station in uplink,
   wherein each of the different precoders is a 2L*L precoding matrix, where L is a number of layers, and
   wherein the different precoders are respectively applied to the two REs of the first RE set by jointly precoding 2L*1 transmission symbols in the first RE through two 2L*L precoding matrices.

9. A base station apparatus supporting full duplex in a wireless communication system, the base station apparatus comprising:
   a memory; and
   a processor connected to the memory,
   wherein the processor is configured to
   transmit a first resource element (RE) set including two REs to the UE based on different precoders to the two REs of the first RE set, and
   receive a second RE set including two REs from a plurality of UEs including the UE while the first RE set is transmitted based on different post-coders to the two REs of the second RE set,
   wherein code division multiplexing (CDM) codes are respectively applied to the first RE set transmitted from the base station to the UE in downlink and the second RE set transmitted from the UE to the base station in uplink,
   wherein each of the different precoders is a 2L*L precoding matrix, where L is a number of layers, and
   wherein the different precoders are respectively applied to the two REs of the first RE set by jointly precoding 2L*1 transmission symbols in the first RE through two 2L*L precoding matrices.

* * * * *